(12) United States Patent
Sharma et al.

(10) Patent No.: US 7,041,987 B1
(45) Date of Patent: May 9, 2006

(54) INSPECTION OF COMMON MATERIALS FOR RADIATION EXPOSURE BY ATOMIC AND/OR MAGNETIC FORCE MICROSCOPY

(75) Inventors: Jagadish Sharma, Silver Spring, MD (US); Joseph P. Teter, Mt. Airy, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 468 days.

(21) Appl. No.: 10/372,115

(22) Filed: Feb. 25, 2003

(51) Int. Cl.
*G01T 1/04* (2006.01)

(52) U.S. Cl. .................................. 250/473.1

(58) Field of Classification Search ............. 250/473.1, 250/472.1; 73/105
See application file for complete search history.

(56) References Cited

U.S. PATENT DOCUMENTS 6,466,895 B1 * 10/2002 Harvey et al. .............. 702/181
6,538,730 B1 * 3/2003 Vaez-Iravani et al. ... 356/237.2

OTHER PUBLICATIONS

Robert L. Fleischer, "Serendipitous Radiation Monitors", American Scientist, vol. 90, pp. 324-331, Jul.-Aug. 2002.
Michael A. Levi and Henry C. Kelly, "Weapons of Mass Disruption", Scientific American, pp. 77-81, Nov. 2002.

* cited by examiner

*Primary Examiner*—Constantine Hannaher
*Assistant Examiner*—Marcus Taningco
(74) *Attorney, Agent, or Firm*—Jane Barrow

(57) ABSTRACT

A method of detecting a defect on a surface of a material due to exposure of the material to incident ionizing radiation, the method comprising the step of:
inspecting a solid material having an atomically flat surface by at least an Atomic Force Microscope (AFM) or a Magnetic Force Microscope (MFM) for a defect in atomic structure on said surface due to exposure to ionizing radiation.

42 Claims, 8 Drawing Sheets

INSPECTION OF COMMON MATERIALS FOR RADIATION EXPOSURE BY ATOMIC AND/OR MAGNETIC FORCE MICROSCOPY

BACKGROUND OF THE INVENTION

1. Field of the Invention

This invention relates to ionizing radiation detectors and, more particularly, to a method of detecting incident ionizing radiation exposure using an Atomic Force Microscope and/or a Magnetic Force Microscope.

2. Description of the Prior Art

Radiation is not visible to the naked eye and yet exposure to certain classes and amounts of ionizing radiation can result in death. Presently, there are numerous different types of dosimeters to monitor exposure to various classes of ionizing radiation and to quantitatively determine the radiation dose. Some of the different dosimeters are: thermoluminescent dosimeters (TLD's), ionization-type radiation detectors, photographic film, Geiger counters and radiochromic materials. Using thermoluminescent dosimeters based on properly doped pellets of calcium fluoride or lithium fluoride usually carries out low-level dosimetery. During heating, the samples emit light whose intensity is recorded thereby indicating a basis of dose to which the material has been exposed.

Increased security concerns have lead to radiation detection systems being positioned at airports, harbors, rail stations, tunnels, highways and borders. There are investigations being conducted to locate dangerous materials that may have been stolen. Routine checks of scrap-metal yards and landfills sites are also being examined for any illegal or accidental disposal of dangerous materials.

Studying and monitoring of ionization radiation and the effects it causes has drawn theoretical and experimental attention for almost a century. Alpha, beta, gamma rays, nuclear decay and particle bombardment from accelerators causes nanometer size physical defects in solids, which cannot be directly seen in optical microscopes due to their small size. The damage indirectly manifests itself in many physical and chemical properties, such as color centers, fluorescence and thermoluminescensce, cross-linkage in polymers, and decontamination of food, etc., which have been widely utilized. The direct observation of the damaged areas was only achieved by chemically etching of the solid and enlarging the induced defects by a factor ranging from 20 to 200 in order for the defects to be seen by ordinary microscopes, see Fleischer, R. L., Serendipitous Radiation Monitors, *American Scientist*, Vol. 90, 324–331, 2002. Fleischer examined glass and plastic objects that were exposed to radiation over fifty years ago.

OBJECTS OF THE INVENTION

Accordingly, one of the objects of the present invention to provide a method for detecting accumulated ionizing radiation on common objects in general surroundings for forensic investigation.

It is another object of the present invention to provide a method for detecting recently accumulated ionizing radiation on common objects in general surroundings where detectors had not been placed.

It is yet another object of the present invention to provide a method for detecting recently accumulated ionizing radiation on a commonly available material provided to a general area.

It is still another object of the present invention to provide a method for detecting recently accumulated ionizing radiation by inspecting for defects to the atomic and molecular structure on the surface of an object by using AFM and/or MFM.

It is yet still another object of the present invention to provide a method for monitoring for inadvertent ionizing radiation exposure by inspecting for defects to the atomic and molecular structure on the surface of an organic or inorganic object by using AFM and/or MFM.

It is still another object of the present invention to provide a method for determining the dose of accumulated ionizing radiation received in an area where a radiation source might have been stored surreptitiously.

It is still yet another object of the present invention to provide a method for determining the class of radiation provided in an area.

It is a further object of the present invention to provide a dosimeter to use in an AFM and/or MFM to examine for defects due to ionizing radiation.

It is still a further object of the present invention to provide a method of electronically detecting damage to magnetic domains in a computer data storage medium.

SUMMARY OF THE INVENTION

These and other objects of this invention are achieved in a preferred method of the invention by a method of detecting a defect on a surface of a material due to exposure of the material to incident ionizing radiation, the method comprising the step of: inspecting a solid material having an atomically flat surface by an Atomic Force Microscope (AFM) and/or a Magnetic Force Microscope (MFM) for a defect in atomic structure on the surface due to exposure to ionizing radiation. It also includes a method of detecting the effect of target radiation on a surface of a material, the method comprising the step of: inspecting a solid material having an atomically flat surface by an Atomic Force Microscope (AMF) and/or a Magnetic Force Microscope (MFM) for a defect in atomic structure on the surface of the material due to recent exposure to target radiation. It includes a method of detecting the exposure of an item to incident ionizing radiation, the method comprising the steps of: providing a solid material or coating on a material and the material or coating having a substantially atomically flat surface to an Atomic and/or Magnetic Force Microscope; inspecting the material for atomic defects caused by incident ionizing radiation; and determining if the material has been exposed to ionizing radiation. It further includes a dosimeter for detecting incident ionizing radiation using Atomic Force Microscope (AFM) and/or Magnetic Force Microscope (MFM) comprising: an organic, inorganic or magnetic material having an atomically flat surface, wherein the material is examined by AFM and/or MFM for a defect on the surface from ionizing radiation. A method of electronically detecting damage to magnetic domains in a computer data storage medium, the method comprising the steps of: electronically interrogating magnetic domains using a standard read-write head for damage domains; and determining if there is damage to the magnetic domains in a computer data storage medium.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

An atomic force microscope (AFM) is an ultra-sensitive force transduction system. In the AFM, a sharp tip is situated at the end of a flexible cantilever and scanned over a sample's surface. While scanning, the cantilever is deflected by the net sum of the attractive and repulsive forces between the tip and the sample. Plots of time displacement or resonance changes as it traverses the sample's surface are used to generate a topographic image. The image generated can have a magnification of upwards of one million times. This magnification allows for the direct imaging of the damage caused by radiation. Such images reveal the three-dimensional structure of a wide variety of sample types including materials, chemicals and biological specimens. AFM can be used at ambient temperature.

Figure 1A:
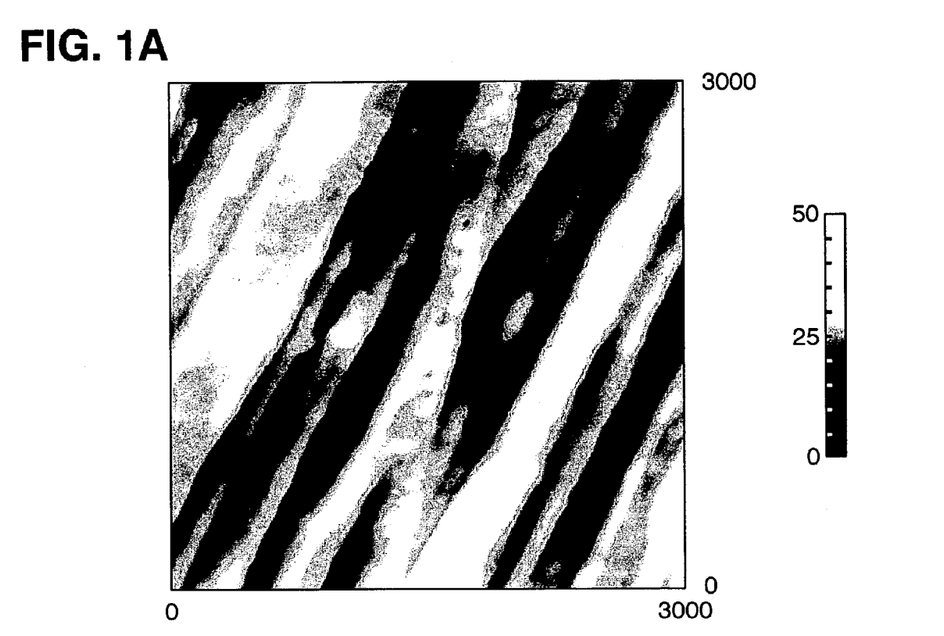
FIG. 1A is an AFM image of a surface of a sheet of common commercial plastic that has not been intentionally irradiated with ionizing radiation.
Figure 1B:
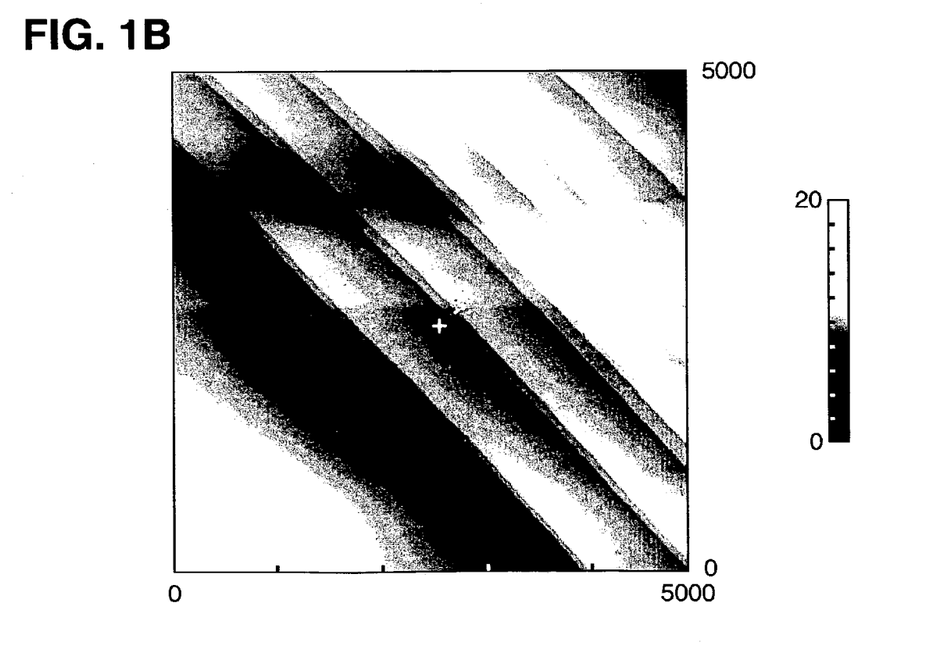
FIG. 1B is an AFM image of a surface of an organic sugar that has not been intentionally irradiated with ionizing radiation.
Figure 1C:
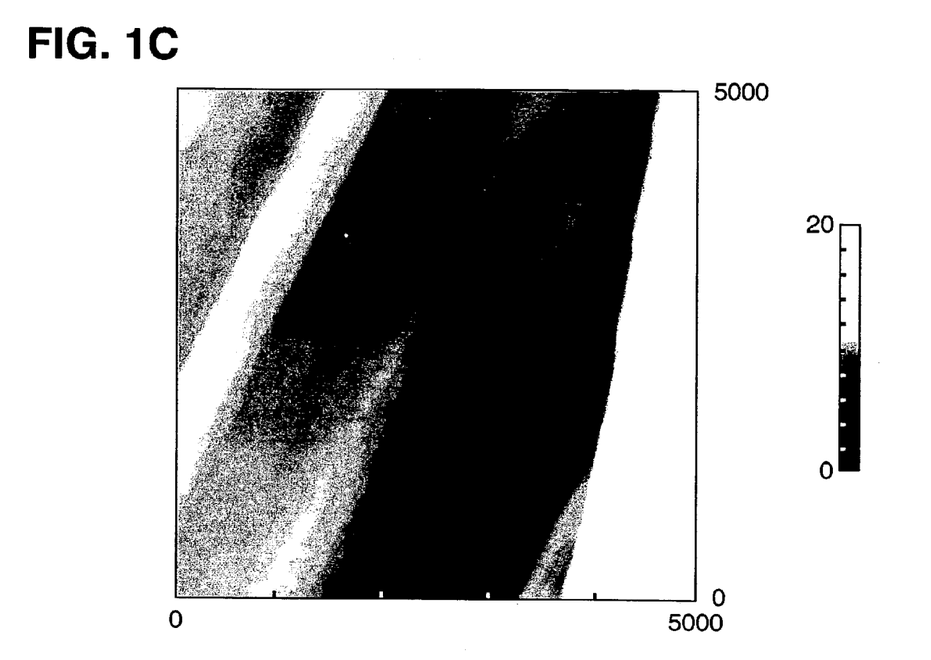
FIG. 1C is an AFM image of a surface of calcite, an inorganic material that has not been intentionally irradiated with ionizing radiation.
Figure 2:
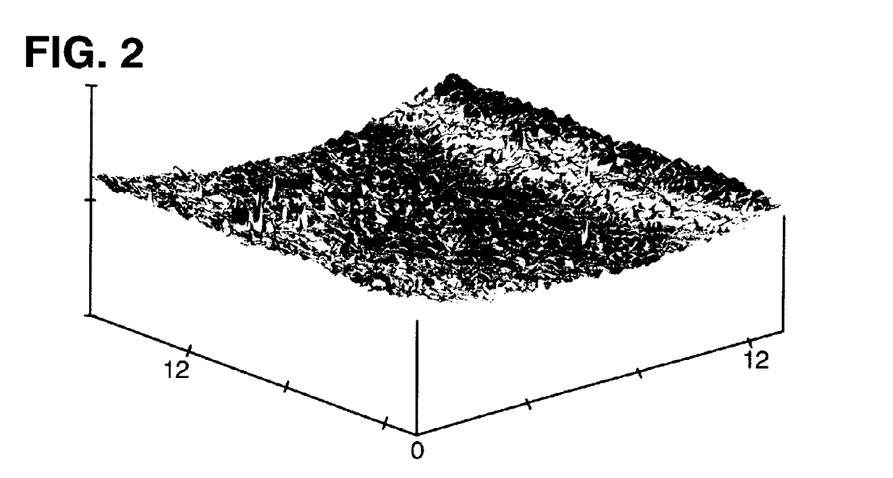
FIG. 2 is an AFM image of a coating on a computer hard disc that has not been intentionally irradiated with ionizing radiation.

FIGS. 1A, B and C are AFM images of a surface of a common commercial sheet of plastic, an organic material, sugar, and an inorganic material, calcite, that have not been intentionally irradiated with ionizing radiation. There are no defects found upon inspection due to lack of exposure from individual ions or photons on the materials. Monitoring the same material repeatedly allows for the determination that no exposure to incident ionizing radiation has occurred. FIG. 2 is an AFM image of the topography of the coating on a computer hard disc that has not been intentionally irradiated with ionizing radiation.

Figure 3:
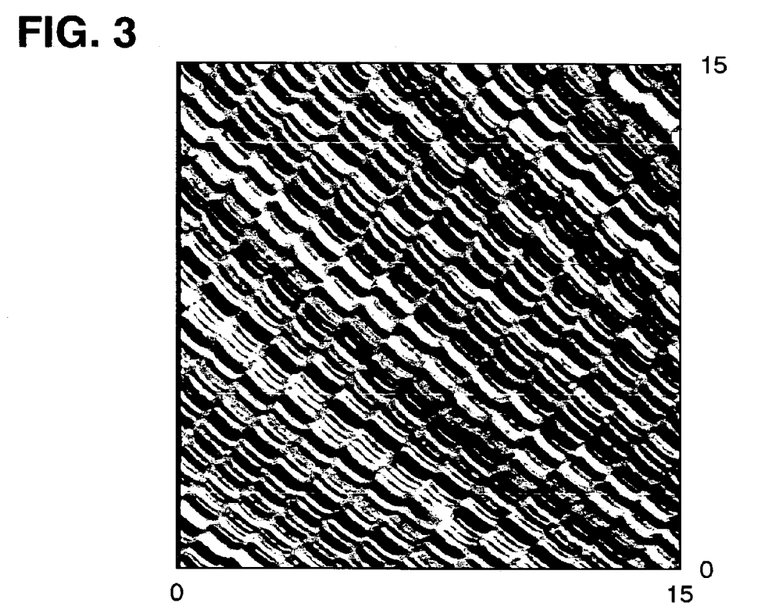
FIG. 3 is an MFM image of a computer hard disc that has not been intentionally irradiated with ionizing radiation.

A MFM image can be acquired through use of two consecutive AFM scans in which the AFM probe tip carries a magnetic moment. The scan is a normal oscillatory near surface scan in which the surface topology is recorded. The second scan uses the topology record to allow the probe tip to rescan the sample at a set fixed height above the surface. In this second scan, the phase is recorded which corresponds to the strength of the magnetic interaction between the sample and the probe tip magnetism. The MFM used on computer magnetic storage media shows the magnetic writing of computer bits and shows if the writing has been damaged by radiation. FIG. 3 is an MFM image of magnetic bits on a computer hard disc that have not been intentionally irradiated with ionizing radiation.

Alpha, beta, gamma, x-ray and particles from an accelerator or nuclear disintegration are known as classes of ionizing radiation, target radiation. The extent to which one or more of these classes of ionizing radiation penetrates a target material depends on both the kind of radiation and the kind of material exposed. Alpha particles are the least penetrating and therefore the least dangerous. Alpha particles will penetrate the surface of many organic and inorganic objects and can inflict great damage to the atomic surface structure. Beta and gamma particles will penetrate more materials than alpha particles. Thus, each of these particles can disrupt the natural surface of an object. FIGS. 1A, B and C, 2 and 3 provide examples of surfaces of common materials that have not been intentionally irradiated with ionizing radiation.

Most common materials found in a target area can be inspected for ionizing radiation damage by using the AFM. The materials should have an atomically flat surface at the side of observation. The materials can be organic material, e.g., food, plastic and vegetation, biological, and inorganic material, e.g., mica, quartz, silicon crystals, explosives and potential explosives. A potential explosive might be fertilizer and an explosive might be TNT, RDX or HMX. A computer hard disc has a polymer coating. Both the coating and the magnetic bits are suitable materials for inspection by an AFM for physical damage and a MFM for revealing the damage to the written magnetic bits.

Defects are created to the atomic and/or molecular structure of numerous organic and inorganic materials when the material has been exposed to ionizing radiation. A defect is a permanent disruption of the atomic and/or molecular structure of a surface of a material by incident ionizing radiation as observed from an image captured by AFM and/or MFM. The defects created by individual ions or photons have been directly imaged in the AFM and the defects have been found to have varying morphology depending on the shape. Depending on the physical and chemical properties of the materials and the crystal orientations, the defects (the damaged structures) appear in different shapes. Not all possible defects are noted below. Pits and triangular pyramids pits have been observed on the surface of L-alanine, RDX and sugar, FIGS. 4–6, respectively. Raised mounds/irregular shapes have been observed on the surface of anthracene, FIG. 7. Square hills have been observed on the surface of calcite, FIG. 8. Small hills have been observed on the surface of natural quartz and silicon crystals, FIGS. 9 and 10, respectively. Pits range from about 60 to about 600 nm in length and about 5 to about 80 nm in depth, raised mounds range from about 200 to about 300 nm in diameter and about 30 to 60 nm in height, and hills range from 100 to about 450 nm on each side, 0.5–80 nm in height and about 50–150 nm in diameter. Generally, defects have a size in a lateral direction of from about 50 nm to about 1000 nm.

There is a polymer coating provided on a computer hard disc. When a computer hard disc is exposed to incident radiation, the size of the defect is approximately the size of a magnetic bit on the disc. Surface damage indicated by raised mounds with irregular shapes have been observed on the surface of the computer hard disc using the AFM and actual damage to the magnetic bit is observed with the MFM, FIGS. 11 and 12, respectively.

Figure 10:
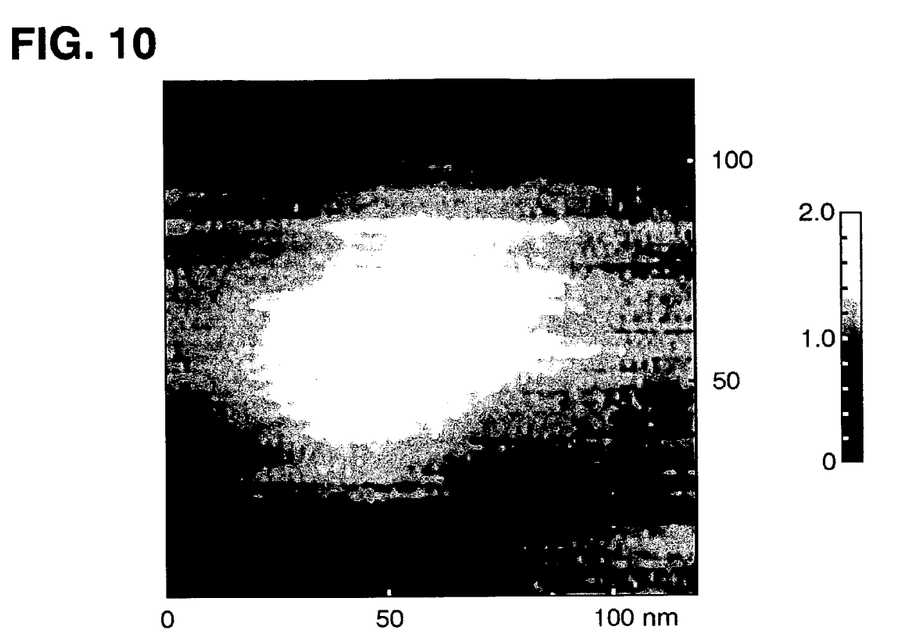
FIG. 10 is an AFM image of a single crystal of silicon that has been irradiated with 12 MeV of carbon ions.

An estimate can be made of the number of incident ions that interact with the material near the material's surface from an area scanned in the image frame, e.g., in FIG. 10 the number of hills, defects, per square area of a single crystal of silicon can provide a dose measurement. This can form the basis of direct and absolute dosimetery. The class of radiation can be determined from an inspection of the surface of a material for a shape and size of defect. The distance of the source from the material or its strength can be determined by the intensity of the defect damage. The distance of the source from the material examiner or its strength can also can be determined for gamma radiation by inspecting the surfaces of a sectional or cleaved sample A sample material can be selected from a target area or provided to a target area and at a later date retrieved, e.g., numerous chips of MYLAR® can be provided to an area or a previously inspected sample material is re-examined again thereby monitoring for a change in the atomic surface of the material due to exposure. A small piece ranging in size from about 1 mm$^2$ to about 182 cm$^2$ is provided to the stage of an AFM and/or a MFM for inspection. The microscope scans the atomically flat surface of the material or the coating on the surface of material inspecting for a defect on the surface of the material due to incident ionizing radiation. An image of the defect area can be captured. An examination of the defect can reveal whether the material was exposed to alpha, beta, gamma, x-ray, nuclear disintegration or atomic particles or a mixture of any of these classes of ionizing radiation, target radiation. The dose, number of incidents, of radiation that interact with the material and the distance of the material from the source of the ionizing radiation can be determined.

A sample of organic or inorganic material having an atomically flat surface at the scale of observation can be a dosimeter of this kind and thus examined for detects due to any exposure of incident ionizing radiation using AFM and/or MFM. The dosimeter can be used repeatedly to monitor for exposure to incident ionizing radiation by inspecting the surface of an organic or inorganic sample for defects.

Alternatively to a MFM probe, a standard read-write head can be used to electronically interrogate magnetic domains looking for damaged domains and determining if there is damage to the magnetic bits in a computer data storage medium. The method includes electronically interrogating magnetic domains using a standard read-write head for damaged domains and determining if there is damage to the magnetic domains in a computer data storage medium.

EXAMPLE 1

Figure 4:
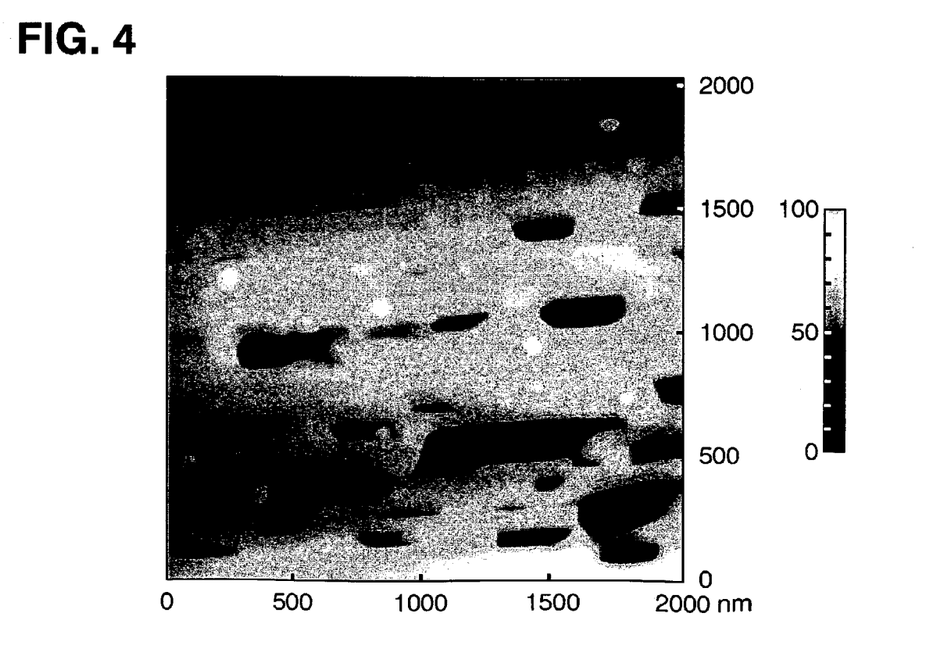
FIG. 4 is an AFM image of L-alanine that has been irradiated with 12 MeV carbon ions.

FIG. 4 is an image of oriented rectangular pits produced on a cleaved surface of L-alanine by 12 MeV of carbon ions. The pits, taking the shape of cyrstallographically oriented sharply defined rectangular pits, are oriented on the crystal face and are 60–350 nm long, 20–80 nm wide and have non-uniform depth ranging over 10–80 nm. The debris, white specks, around the pits suggests physical ejection of the material.

EXAMPLE 2

Figure 5A:
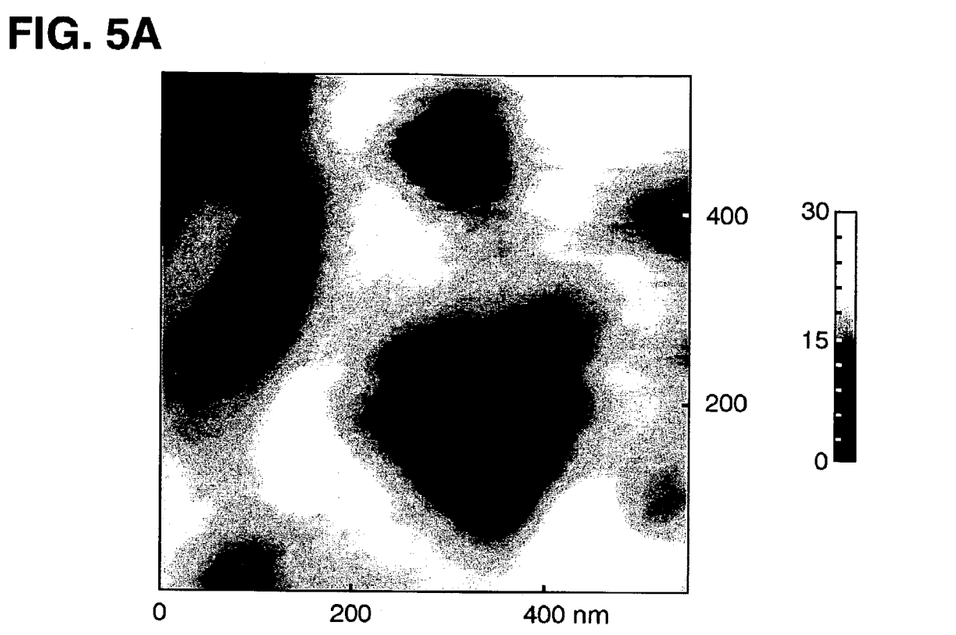
FIG. 5A is an AFM image of RDX, a common explosive that has been irradiated with 0.662 MeV gamma ray photons.
Figure 5B:
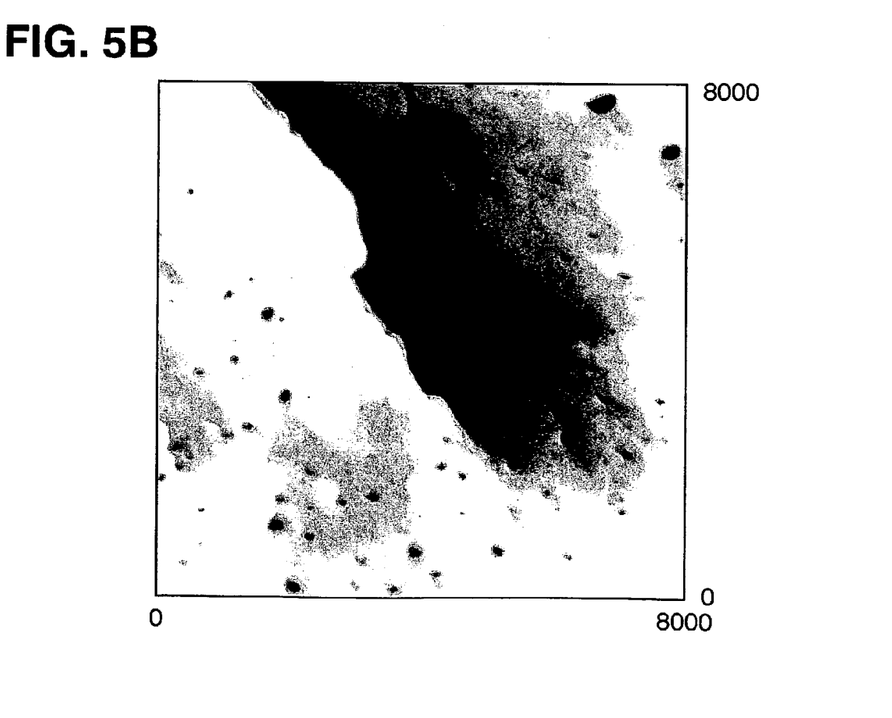
FIG. 5B is an AFM image of RDX that has been irradiated with 15 KeV x-ray photons.

FIG. 5A is an AFM image of RDX that has been intentionally subjected to 0.662 MeV x-ray photons from $Cs^{137}$ source. Inverted triangular pyramids pits, 200–500 nm on a side were observed with depths of 10–20 nm. FIG. 5B is an AFM image of RDX that has been irradiated with 15 KeV gamma ray photons. This is approximately the same amount of radiation provided by airport luggage scanners.

EXAMPLE 3

Figure 6:
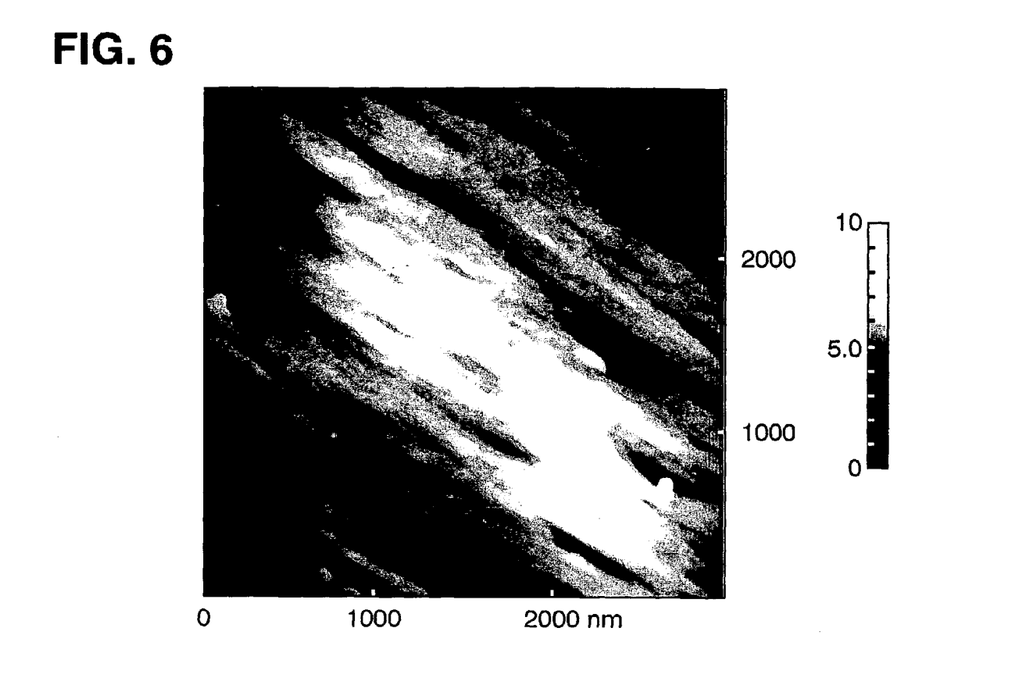
FIG. 6 is an AFM image of rock candy that has been irradiated with 0.662 MeV gamma ray photons.

FIG. 6 is an AFM image of rock candy grain that has been intentionally subjected to 0.662 MeV gamma ray photons. The pits observed on RDX, FIG. 5, appear to be the same as those observed on rock candy. The sides of the triangular pyramid pits range from 200 to 600 nm and the depth is between 5 and 15 nm. Small round globules, between 80 and 100 nm in diameter, or enlongated extrusions that suggest melting and re-solidification and perhaps suggest that decomposition has occurred, accompanied some of the pits. The AFM image showed 108 defects per cm$^2$, from a 2,424 R exposure.

EXAMPLE 4

Figure 7:
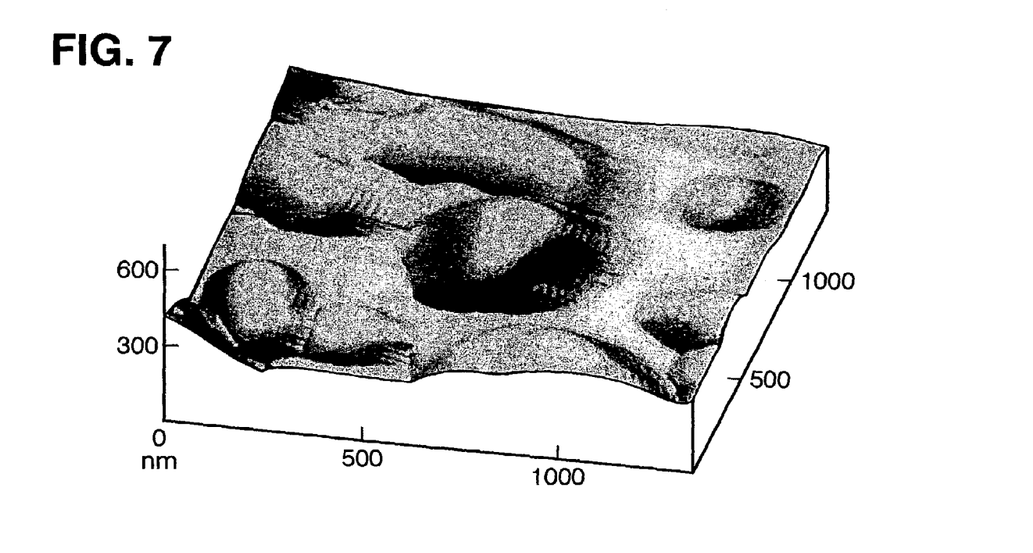
FIG. 7 is an AFM image of anthracene that has been irradiated with 12 MeV carbon ions.

FIG. 7 is an AFM line plot image of a cleaved surface of anthracene that has been intentionally subjected to $C^{+4}$ ions. Anthracene has a low melting point, i.e., 216° C. The raised mounds with irregular shape, 200 to about 300 nm in diameter and about 30 to about 60 nm in height were produced from exudation.

EXAMPLE 5

Figure 8:
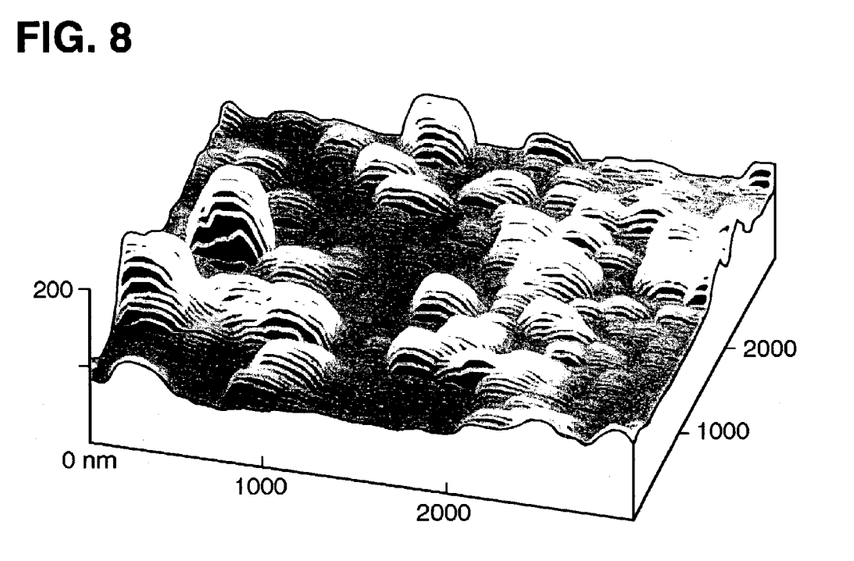
FIG. 8 is a line plot of an AFM image of natural calcite that has been irradiated with gamma ray photons.

FIG. 8 is an AFM line plot image of a cleaved surface of calcite. Square headed hills were observed on the surface after it was intentionally subjected to gamma ray photons. The base of the square hills ranges from 100 to about 450 nm on each side and a height of about 5 to about 80 nm. The square hills are possibly due to decomposition of the carbonate functional group. It should be noted that this sample has probably been subjected to radiation due to the fact that the sample has been in the environment for geological ages and thus has a radiation history.

EXAMPLE 6

Figure 9:
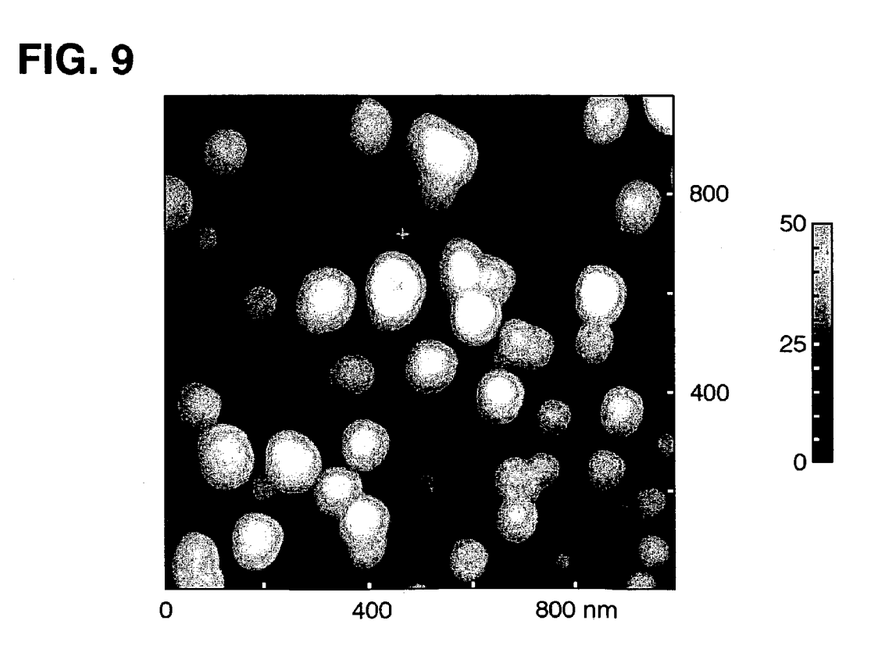
FIG. 9 is an AFM image of natural quartz that has been irradiated with 0.662 MeV gamma ray photons.

FIG. 9 is an AFM image of natural amethyst quartz that has been intentionally subjected with 0.662 MeV gamma ray photons. The hills are about 50 to about 150 nm in diameter and about 2 to about 30 nm in height. Possibly melting of the quartz is providing the small hills. The natural quartz would also have a radiation history of geological ages. In this regard, recently formed objects, such as sugar crystals and plastics, do not carry a geological history or radiation exposure and are therefore preferable.

EXAMPLE 7

FIG. 10 is an AFM image of a single crystal of silicon. A small hill was observed having a diameter of approximately 50 nm and a height of 0.5–1 nm produced on a (111) face of the single crystal by a 12 MeV $C^{+4}$ ion and a fluence of $10^{12}$ ions $cm^{-2}$ from an accelerator. It appears that plasma formation and temperature rise caused disorder in the lattice and bulged the local material.

EXAMPLE 8

Figure 11:
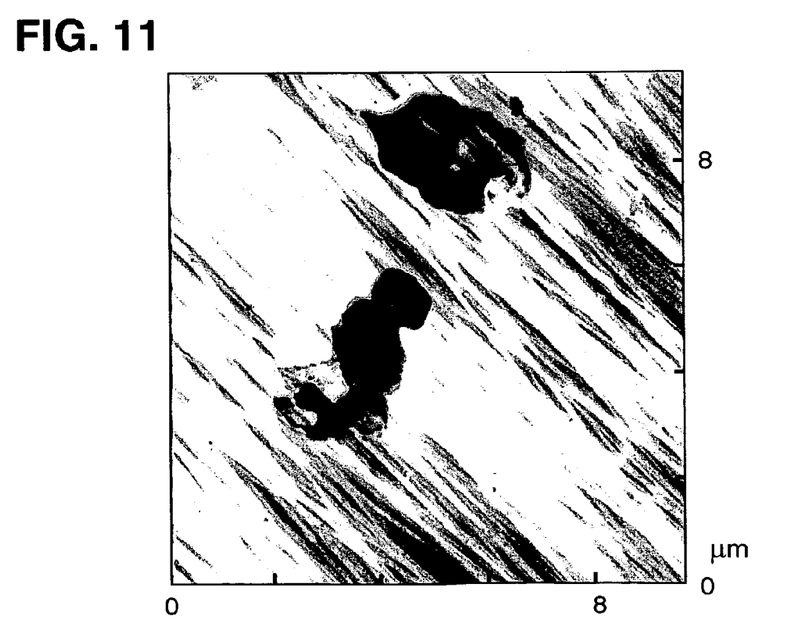
FIG. 11 is an AFM image of a coating on a computer hard disc that has been irradiated by gamma ray photons.
Figure 12:
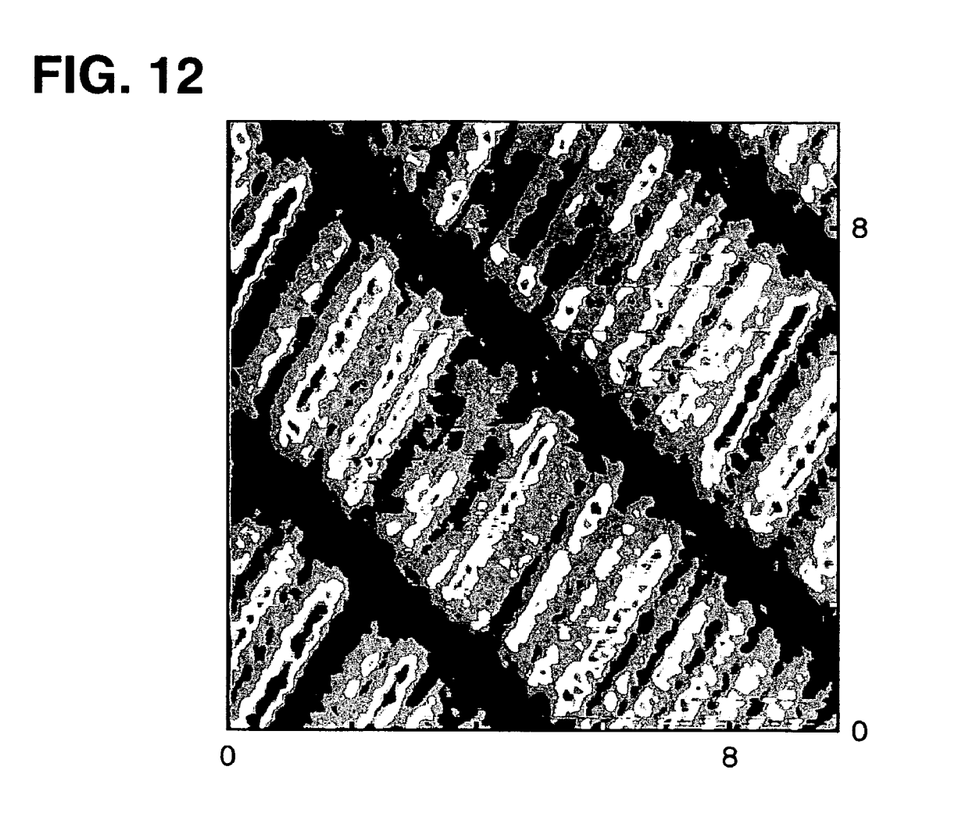
FIG. 12 is an MFM image of magnetic bits under the coating of a computer hard disc that has been irradiated by gamma ray photons.

FIG. 11 is an AFM image of a coating on a computer hard disc that has been irradiated with gamma ray photons, 2,000 Rads. FIG. 11 shows topography of the damaged polymer coating. Physical damage of the polymer appears to be in the form of eruptions of the surface. FIG. 12 is an MFM image of the same computer hard disc subjected to the same irradiation. The micrometer size lines are the bits used in data storage. It can be seen that some bits have been damaged and partly erased. Their position corresponds with the density, damaged area of the polymer protective coating, FIG. 11. These images demonstrate that individual photons can erase and destroy bits through heat. The number of bits affected will depend on their size, which implies that in the future, with the decrease in bit size, the vulnerability of the discs will increase. The present results show that with a MFM, the radiation damage caused to a computer hard disc can be read. It is expected that a large dose of radiation would destroy the format of the disc and possibly crash a computer. It is also expected that radiation could affect a computer chip.

Therefore, what has been described above is a method, which utilizes AFM and/or MFM for inspecting/detecting and/or monitoring for accumulated ionizing radiation exposure by inspecting for defects to the atomic and molecular structure on a surface of an object by using AFM and/or MFM of common objects for forensic investigation.

It should therefore readily be understood that many modifications and variations of the present invention are possible within the purview of the claimed invention. For example, other smooth flat surfaces could be used.

What is claimed is:
1. A method of detecting a defect on a surface of a material due to exposure of the material to incident ionizing radiation, the method comprising the step of:
   inspecting a solid material having an atomically flat surface by at least an Atomic Force Microscope (AFM) or a Magnetic Force Microscope (MFM) for a defect in atomic structure on said surface due to exposure to ionizing radiation; and
   identifying said ionizing radiation that caused said defect.
2. The method of claim 1, wherein said material is a common object found in an area suspected of exposure to incident ionizing radiation.
3. The method of claim 1, wherein said material is a plastic material.
4. The method of claim 1, wherein said material is a biological item.
5. The method of claim 1, wherein said material is a computer hard disc.
6. The method of claim 1, wherein said material is an explosive or potential explosive material.
7. The method of claim 6, wherein said potential explosive is a fertilizer.
8. The method of claim 6, wherein said explosive is TNT.
9. The method of claim 1, wherein said atomic defect is selected from the group of hills, pits, raised mounds, flat pyramids and mixtures thereof.
10. The method of claim 1, wherein said defect having a size in a lateral direction of from about 50 nm to about 1000 nm.
11. The method of claim 1, wherein said method flier including the step of:
   determining a dose of radiation to which said material has been exposed.
12. The method of claim 1, wherein said method further including the step of:
   determining a distance between a source of said radiation and said material when the strength is known.
13. The method of claim 1, wherein incident ionizing radiation is selected from the group consisting of alpha, beta, gamma rays, x-rays, particle bombardment from accelerators, nuclear decay and mixtures thereof.
14. The method of claim 1, further including the step of monitoring for said defect in said material.
15. A method of detecting the effect of target radiation on a surface of a material, the method comprising the step of:
   inspecting a solid material having an atomically flat surface by at least an Atomic Force Microscope (AMF) or a Magnetic Force Microscope (MFM) for a defect in atomic structure on said surface of said material due to recent exposure to target radiation; and
   identifying said ionizing radiation that caused said defect.
16. The method of claim 15, wherein said material is a common object found in an area suspected of exposure to incident ionizing radiation.
17. The method of claim 15, wherein said material is a plastic material.
18. The method of claim 15, wherein said material is a biological item.
19. The method of claim 15, wherein said material is a computer hard disc.
20. The method of claim 15, wherein said material is an explosive or potential explosive material.
21. The method of claim 20, wherein said material is a fertilizer.
22. The method of claim 20, wherein said material is TNT.
23. The method of claim 15, wherein said atomic defect is selected from the group of hills, pits, raised mounds, flat pyramids and mixtures thereof.
24. The method of claim 15, wherein said defect having a size in a lateral direction of from about 50 nm to about 1000 nm.
25. The method of claim 15, wherein said method further including the step of:
   determining a dose of radiation to which said material has been exposed.
26. The method of claim 15, wherein said method further including the step of:
   determining a distance between a source of said radiation and said material.
27. The method of claim 15, further including the step of monitoring for said defect in said material.
28. The method of claim 15, wherein incident ionizing radiation is selected from the group consisting of alpha, beta, gamma rays, x-rays particle bombardment from accelerators, nuclear decay and mixtures thereof.
29. A method of detecting the exposure of an item to incident ionizing radiation, the method comprising the steps of:
   providing a solid material or coating on a material and said material or coating having a substantially atomically flat surface to at least an Atomic or a Magnetic Force Microscope;

inspecting said material for atomic defects caused by incident ionizing radiation; and
determining if said material has been exposed to ionizing radiation; and
identifying said ionizing radiation that caused said defect.

30. The method of claim 29, wherein said material is a common object found in an area suspected of exposure to incident ionizing radiation.

31. The method of claim 29, wherein said material is a plastic material.

32. The method of claim 29, wherein said material is a biological item.

33. The method of claim 29, wherein said material is a computer hard disc.

34. The method of claim 29, wherein said material is an explosive or potential explosive material.

35. The method of claim 34, wherein said material is a fertilizer.

36. The method of claim 34, wherein said material is TNT.

37. The method of claim 34, wherein said atomic defect is selected from the group of hills, pits, raised mounds, flat pyramids and mixtures thereof.

38. The method of claim 34, wherein said defect having a size in a lateral direction of from about 50 nm to about 1000 nm.

39. The method of claim 29, wherein said method further including the step of:
    determining a dose of radiation to which said material has been exposed.

40. The method of claim 29, wherein said method further including the step of:
    determining a distance between a source of said radiation and said material.

41. The method of claim 29, further including the step of monitoring for said defect in said material.

42. The method of claim 29, wherein incident ionizing radiation is selected from the group consisting of alpha, beta, gamma rays, x-ray, particle bombardment from accelerators, nuclear decay and mixtures thereof.

* * * * *